United States Patent
Basnayake et al.

(10) Patent No.: US 9,083,414 B2
(45) Date of Patent: Jul. 14, 2015

(54) LTE MIMO-CAPABLE MULTI-FUNCTIONAL VEHICLE ANTENNA

(75) Inventors: Chaminda Basnayake, Windsor (CA); Curtis L. Hay, Clarkston, MI (US); Eray Yasan, Canton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 244 days.

(21) Appl. No.: 13/570,763

(22) Filed: Aug. 9, 2012

(65) Prior Publication Data
US 2014/0043204 A1    Feb. 13, 2014

(51) Int. Cl.
| | |
|---|---|
| *H01Q 1/32* | (2006.01) |
| *H01Q 21/00* | (2006.01) |
| *H04B 7/08* | (2006.01) |
| *H01Q 21/24* | (2006.01) |
| *H01Q 21/28* | (2006.01) |
| *H01Q 21/30* | (2006.01) |
| *H04B 7/04* | (2006.01) |
| *H04B 7/10* | (2006.01) |

(52) U.S. Cl.
CPC ........... *H04B 7/0825* (2013.01); *H01Q 1/3275* (2013.01); *H01Q 21/24* (2013.01); *H01Q 21/28* (2013.01); *H01Q 21/30* (2013.01); *H04B 7/0413* (2013.01); *H04B 7/10* (2013.01)

(58) Field of Classification Search
CPC ..... H01Q 1/3275; H01Q 21/24; H01Q 21/28; H01Q 21/30
USPC .......................................... 343/711, 713, 893
See application file for complete search history.

(56) References Cited

U.S. PATENT DOCUMENTS

| | | | |
|---|---|---|---|
| 7,034,758 B2 | 4/2006 | Haidacher et al. | |
| 8,686,907 B2* | 4/2014 | Jan et al. | 343/713 |
| 2006/0044196 A1 | 3/2006 | Grant et al. | |
| 2006/0279465 A1* | 12/2006 | Moon et al. | 343/700 MS |

FOREIGN PATENT DOCUMENTS

| | | |
|---|---|---|
| DE | 10330087 B3 | 1/2005 |
| DE | 102007055323 A1 | 6/2009 |
| DE | 102009038038 A1 | 2/2011 |

OTHER PUBLICATIONS

German Search/Ecxam report corresponding to German Patent Application No. 10 2013 215 363.5, dated Jul. 21, 2014, 5 pages.

* cited by examiner

*Primary Examiner* — Hoang V Nguyen
(74) *Attorney, Agent, or Firm* — Anthony Luke Simon; Reising Ethington P.C.

(57) ABSTRACT

A multifunctional vehicle antenna assembly that includes a primary multiple input and multiple output (MIMO) antenna component; a secondary MIMO antenna component; and a global navigation satellite system (GNSS) antenna component, wherein the GNSS antenna component is located between the primary MIMO antenna component and the secondary MIMO antenna component and is located nearer to the secondary MIMO antenna component.

18 Claims, 3 Drawing Sheets

LTE MIMO-CAPABLE MULTI-FUNCTIONAL VEHICLE ANTENNA

TECHNICAL FIELD

The present invention relates to multi-functional vehicle antenna assemblies and more specifically to antennas that are LTE MIMO-capable.

BACKGROUND

Modern vehicles include a plurality of antenna that receive a variety of different signals. Apart from broadcast signals received by an AM/FM radio antenna, vehicles can also be equipped with one or more other antenna that can receive global navigation satellite system (GNSS) signals, satellite radio signals, and cellular communication signals, to name a few. That is, the vehicle can use one antenna to receive GPS signals, one antenna to receive satellite radio signals, and one antenna to both send and receive voice/data communications over via cellular communications protocols. Cellular communications are increasingly carried out using a 4G long-term evolution (LTE) protocol developed and defined by the 3rd Generation Partnership Project (3GPP), which uses multiple-input and multiple-output (MIMO) antennae. However, the receipt and/or transmission of signals via MIMO antennae along with the receipt of signals via GNSS, satellite radio, and/or terrestrial radio using different antennae at one point, such as at a vehicle, can lead to interference problems. It is possible to minimize signal interference by separating each antenna from other antenna by a significant distance. But positioning one antenna apart from one or more other antenna can result in a more costly implementation due to the additional material and installation costs to do so.

SUMMARY

According to an embodiment, there is provided a multi-functional vehicle antenna assembly that comprises a primary multiple input and multiple output (MIMO) antenna component; a secondary MIMO antenna component; and a global navigation satellite system (GNSS) antenna component, wherein the GNSS antenna component is located between the primary MIMO antenna component and the secondary MIMO antenna component and is located nearer to the secondary MIMO antenna component.

According to another embodiment of the invention, there is provided a multifunctional vehicle antenna assembly that comprises a primary multiple input and multiple output (MIMO) antenna component; and a secondary MIMO antenna component, wherein the primary MIMO antenna component and the secondary MIMO antenna component are located less than or equal to 180 millimeters (mm) from each other.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
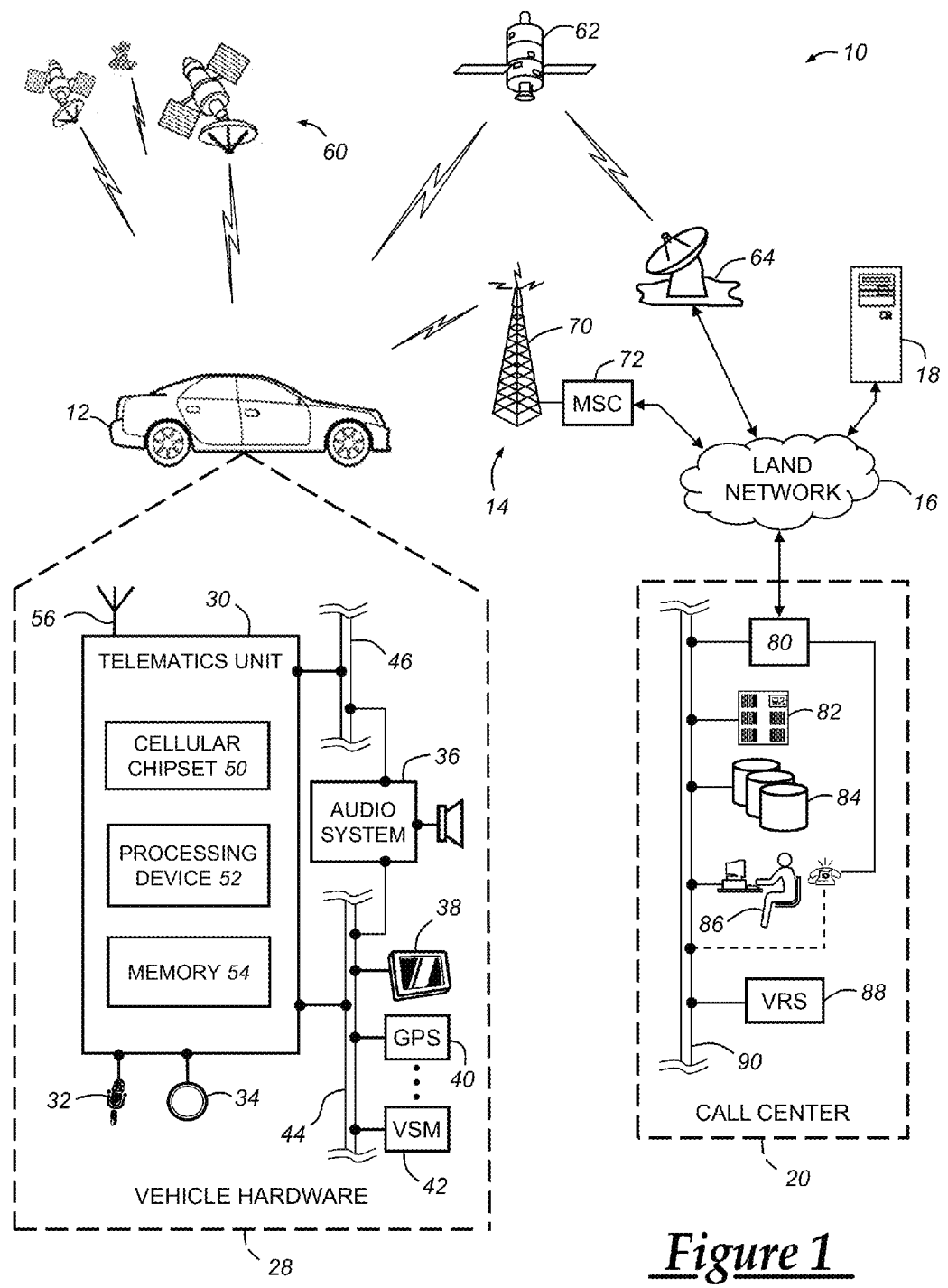
FIG. 1 is a block diagram depicting an embodiment of a communications system that is capable of using the multi-functional vehicle antenna assembly disclosed herein.

The multimodal vehicle antenna assembly described below includes a primary MIMO antenna component and a secondary MIMO component as well as a GNSS antenna component and optionally satellite and terrestrial radio antenna components. Each of the primary and secondary MIMO components, the GNSS antenna component, and the satellite/terrestrial radio components are located in close proximity to each other, an arrangement that can be effectuated by placing these elements within a single protective enclosure.

Traditionally, implementations of multiple MIMO antenna components used spatial diversity to ensure that each MIMO antenna component could coexist and not interfere with the other MIMO antenna components. That is, placing each antenna component a predetermined distance from other antenna components could minimize interference. The predetermined distance can be described as a function of the frequency of the signal. More particularly, antenna component spacing may typically call for a distance that is more than half the wavelength of the frequency at which the antenna components transmit/receive.

However, with respect to a vehicle installation, locating MIMO antenna components sufficiently apart from each other in such a manner can complicate the manufacture of vehicles. For instance, if the primary MIMO antenna component is located on the roof of a vehicle while the secondary MIMO antenna component is located on the trunk lid of the vehicle, then each antenna component may need an opening in the roof or trunk lid, separate cables linking each antenna component to a wireless device, such as a vehicle telematics unit, and protective enclosures for covering each antenna component. Moreover, since signal frequency and wavelength frequency are inversely proportional, decreases in frequency result in increased wavelength thereby increasing the needed distance to implement spatial diversity between antenna components and avoid interference.

In one example, this distance can be 18 inches (in) or more. To explain this it may be helpful to consider that the bandwidth spectrum used by some LTE hardware (e.g., the Evolved Universal Terrestrial Radio Access (E-UTRA) operating bands in 3GPP TS 36.101) includes frequencies that can be as low as 699 megahertz (MHz). For example, the wireless carrier Verizon uses E-UTRA operating band number 13 that in its uplink portion operates between 777-787 MHz and in its downlink portion operates between 746-756 MHz. Using the traditional solution of spatial diversity, half the wavelength of a 746 MHz signal is 200.5 millimeters (mm), which can mean that antenna components should be located greater than this distance apart. But considering that LTE hardware can operate on frequencies as low as 698 MHz having half a wavelength of 215 mm, antenna components may be placed even further apart under when implementing spatial diversity. This can be appreciated from band number 12, used by wireless carrier AT&T, having an uplink portion between 698-716 MHz and a downlink portion between 728-746 MHz.

In contrast, primary and secondary MIMO antenna components can be mounted in close proximity to each other as a single multimodal vehicle antenna assembly. The assembly can include the primary MIMO antenna component, the secondary MIMO antenna component, the GNSS antenna component, the satellite radio antenna component, and the terrestrial radio antenna component in an implementation that locates the primary and secondary MIMO antenna components closer than 200 mm together. This arrangement can be implemented by using primary and secondary MIMO antenna components that have geometrically-shaped field patterns and by placing the primary MIMO antenna component and the secondary MIMO antenna components on opposite ends of the multimodal vehicle antenna assembly. It is also possible to locate the GNSS antenna component nearest to the secondary MIMO antenna component and/or between the secondary MIMO antenna component and the primary MIMO antenna component. This is helpful because in some implementations neither the GNSS antenna component nor the secondary MIMO antenna component transmits signals—they only receive signals. The secondary MIMO antenna component can be shielded from interference caused by the primary MIMO antenna component using the location of GNSS antenna component and optionally the satellite radio antenna component. As a result, it is possible to include the primary and secondary MIMO antenna components along with the GNSS and satellite/terrestrial radio antenna components in a compact multimodal vehicle antenna assembly. Generally speaking, the multimodal vehicle antenna assembly can be realized in a unit that is equal to or smaller than 180 mm in length, 80 mm in width, and 75 mm in height.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 uses cellular communication according to GSM, CDMA, or any other wireless communication standard and thus includes a standard cellular chipset 50 for voice communications like hands-free calling, a wireless modem for data transmission, an electronic processing device 52, one or more digital memory devices 54, and a multifunctional vehicle antenna assembly 56. The multifunctional vehicle antenna assembly 56 can include a plurality of MIMO antenna components, and one or more other antenna components, such as a GNSS antenna component, a satellite radio antenna component, or a terrestrial radio antenna component. For example, the multifunctional vehicle antenna assembly 56 can include a primary MIMO antenna component, a secondary MIMO component, a GNSS antenna component, a satellite radio antenna component, and a terrestrial radio antenna component. In another implementation, the multifunctional vehicle antenna assembly 56 could omit one or more of the above-mentioned antenna components, such as the GNSS antenna component, the satellite radio antenna component, or the terrestrial radio antenna component. As cellular technology evolves, newer cellular standards increasingly use MIMO antenna components. MIMO antenna components generally include multiple antennae for receiving and (optionally) multiple antennae for transmitting wireless signals that carry information. The MIMO antenna components can generally include two or more antenna for receiving, sending, or both sending and receiving information wireless signals as is known to those skilled in the art.

It should be appreciated that the modem can either be implemented through software that is stored in the telematics unit and is executed by processor 52, or it can be a separate hardware component located internal or external to telematics unit 30. The modem can operate using any number of different standards or protocols such as 4G long-term evolution (LTE), LTE Advanced, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GNSS satellites via a GNSS antenna component of the multimodal vehicle antenna assembly 56. The GPS module 40 and GNSS satellites can use one of a variety of standards, such as GPS, GLONASS, Galileo, or other similar satellite navigation system. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, satellite radio, CD, DVD, and other multimedia functionality. This functionality can be provided in conjunction with or independent of the infotainment module described above. In one implementation, the AM/FM (e.g., terrestrial radio) can be received via a terrestrial radio antenna component of the multimodal vehicle antenna assembly 56 whereas satellite radio broadcasts can be received via a satellite radio antenna component of the vehicle antenna assembly 56. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS (4G LTE). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
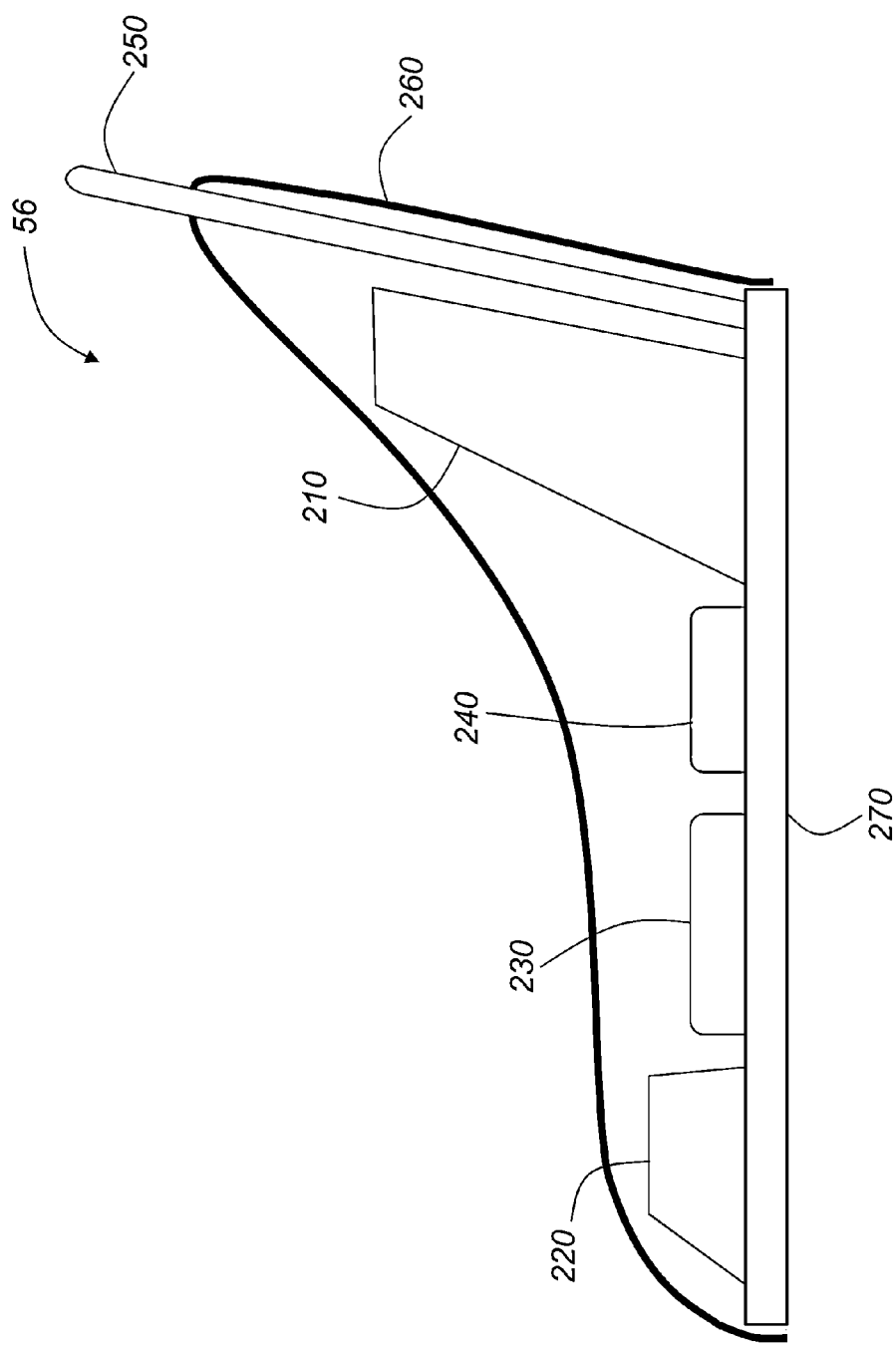
FIG. 2 is an exemplary implementation of a multifunctional vehicle antenna assembly.

Turning now to FIG. 2, there is shown an exemplary implementation of a multifunctional MIMO-capable vehicle antenna assembly 56. The vehicle antenna assembly 56 includes a primary MIMO component 210, a secondary MIMO antenna component 220, and a GNSS antenna component 230 that can be located between the primary MIMO component 210 and the secondary MIMO component 220. The vehicle antenna assembly 56 can also include a satellite radio antenna component 240 as well as a terrestrial radio antenna component 250. Each of the antenna components 210-250 can be enclosed within a weatherproof antenna enclosure 260 and affixed to the roof of the vehicle 12 via a roof-mountable antenna base 270 that either may be part of or carried by the vehicle antenna assembly 56.

To include a plurality of MIMO antenna components in a compact space while also minimizing interference, the primary MIMO antenna component 210, the secondary MIMO antenna component 220, or both components 210/220 can use a geometrically-shaped gain pattern. Such a gain pattern (also referred to as shape diversity or pattern diversity) can result from using geometrically-shaped antennae in the primary/secondary MIMO antenna components 210/220. For instance, in one implementation the primary MIMO antenna component 210 can use one or more vertically-polarized antennae whereas the secondary MIMO antenna component 220 can use one or more horizontally-polarized antennae. Using a horizontally-polarized antenna in close proximity with a vertically-polarized antenna can minimize the interference that has previously occurred and permit the placement of primary MIMO antenna components 210 in close proximity with secondary MIMO antenna components 220. And it is envisioned that the vehicle antenna assembly 56—including the weatherproof enclosure 260—will be no larger than 180 mm in length, 80 mm in width, and 75 mm in height. This implementation can include one primary MIMO component and one secondary MIMO component, which results in a 2×2 MIMO antenna arrangement. However, it is possible to apply these techniques to other implementations using two or more primary antenna components and two or more secondary antenna components thereby resulting in 4×4, 8×8, or other MIMO antenna arrangement.

In addition, the components of the vehicle antenna assembly 56 can be positioned relative to each other according to a particular spatial arrangement that involves locating the primary MIMO antenna component 210 and the secondary MIMO component 220 as far from each other as possible yet still within the vehicle antenna assembly 56. Along with locating the primary antenna component 210 and the secondary MIMO antenna component 220 apart from each other, the GNSS antenna component 230 can be positioned both between components 210 and 220 and nearest to the secondary MIMO antenna component 220. In one example, the act of positioning between components 210 and 220 can include connecting the primary MIMO antenna component 210 and the secondary MIMO antenna component 220 with an imaginary line and locating the GNSS antenna component 230 along that imaginary line. Locating the GNSS antenna 230 component between the primary and secondary MIMO antenna components 210/220 can serve to shield the secondary MIMO antenna component 220 from the transmissions/receptions of the primary MIMO antenna component 210. In this implementation it is envisioned that the primary MIMO antenna component 210 will not only be larger (e.g., physical size, power, etc.) than the secondary MIMO antenna component 220 but also may include the capability to transmit and receive wireless signals whereas the secondary MIMO antenna component 220 may only receive wireless signals. It is also possible to locate the GNSS antenna component 230 nearer to the secondary MIMO antenna component 220 relative to the primary MIMO antenna component 210. Given that both the secondary MIMO antenna component 220 and the GNSS antenna component 230 solely receive wireless signals, positioning them near each other and away from the primary MIMO antenna component 210 can heighten the ability of the primary MIMO antenna component 210 to coexist with the secondary MIMO antenna component 220 within the footprint of the weatherproof enclosure 260 and/or the vehicle roof-mountable antenna base 270. These features can help the vehicle antenna assembly 56 minimize interference between different antenna components.

By including the primary MIMO component 210, the secondary MIMO antenna component 220, the GNSS antenna component 230, the satellite radio antenna component 240 as well as a terrestrial radio antenna component 250 within the weatherproof enclosure 260, each of these components can communicate information to the vehicle 12 via a single cable or bundle of cables (not shown) to the vehicle telematics unit 30 and or vehicle bus 44 shown in FIG. 1. The weatherproof enclosure 260 can take an aerodynamic shape that follows the shape of the antenna components it houses. The cable (or bundle of cables) can pass through the vehicle-roof-mountable antenna base 270 into the weatherproof enclosure 260 where the cable(s) electrically attach to appropriate antenna components.

Figure 3:
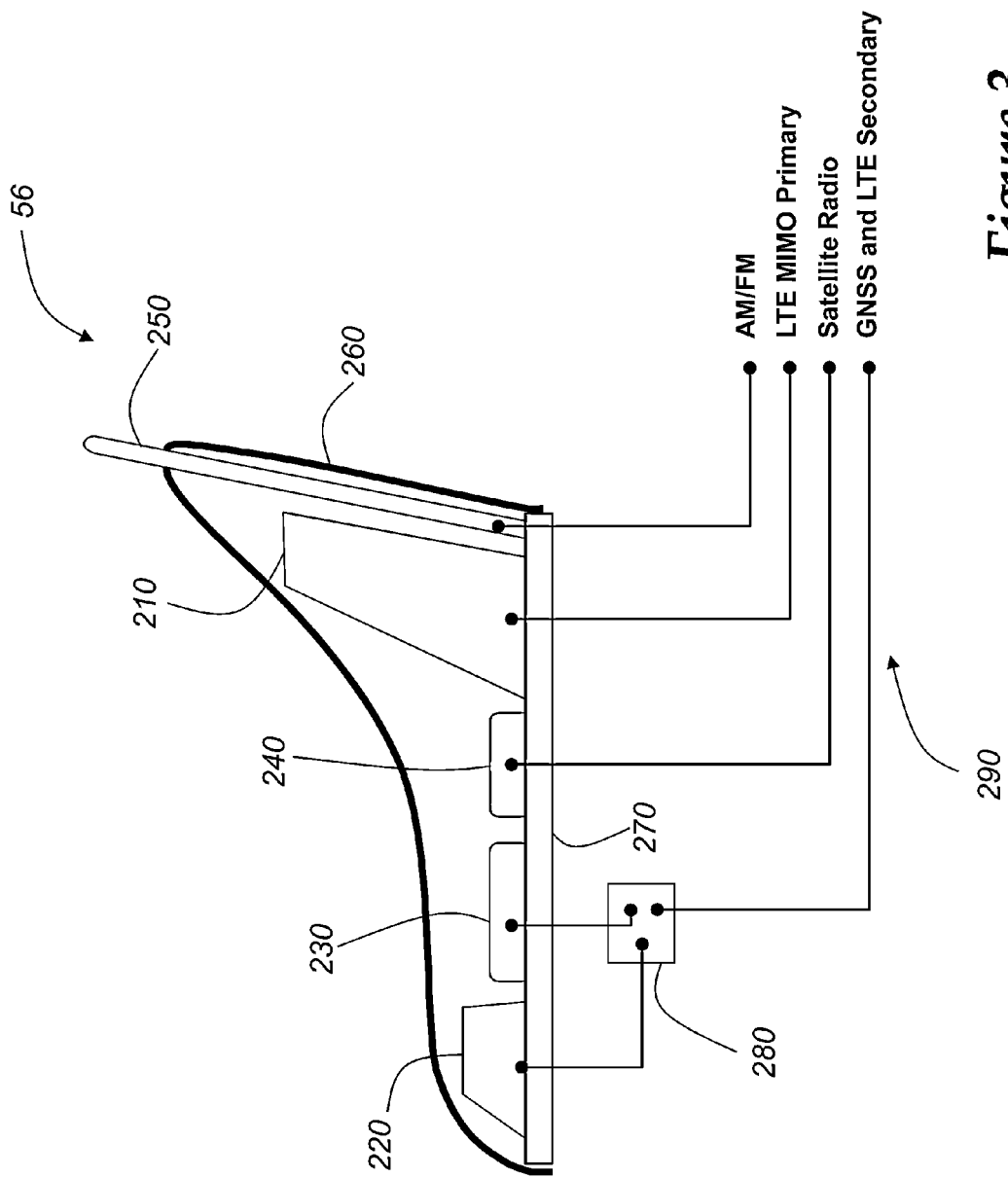
FIG. 3 is another exemplary implementation of a multi-functional vehicle antenna assembly.

Turning to FIG. 3, another exemplary implementation of a multi-functional MIMO-capable vehicle antenna assembly 56 is shown. The vehicle antenna assembly 56 shown in FIG. 3 includes the same components as those shown in FIG. 2. However, in this implementation the secondary MIMO antenna component 220 and the GNSS antenna component can be electrically and/or communicatively connected to the vehicle 12 via a switch 280, such as a diplexer. The switch 280 can be implemented as a physical switch that selectively directs communications from either the secondary MIMO antenna component 220 or the GNSS antenna component 230 to the vehicle 12 where it can be received by the vehicle telematics unit 30 and/or the vehicle bus 44. This switch 280 can be included as part of the vehicle antenna assembly 56. Using the switch 270 for certain services, such as GPS and secondary MIMO antenna tasks, can minimize the number of cables used as part of a cable bundle to connect the vehicle antenna assembly 56 to the vehicle 12. As shown in FIG. 3, the number of cables of the cable bundle, generally shown at 290, used to communicatively link the vehicle antenna assembly 56 to the vehicle 12 can be reduced from five to four thereby decreasing the material cost for realizing the vehicle antenna assembly.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A multifunctional vehicle antenna assembly, comprising:
   a primary multiple input and multiple output (MIMO) antenna component having a plurality of antennas;
   a secondary MIMO antenna component having a plurality of antennas; and
   a global navigation satellite system (GNSS) antenna component, wherein the GNSS antenna component is located between the primary MIMO antenna component and the secondary MIMO antenna component and is located nearer to the secondary MIMO antenna component.

2. The multifunctional vehicle antenna assembly of claim 1, wherein the primary MIMO antenna component and the secondary MIMO antenna component are located no more than 180 millimeters (mm) from each other.

3. The multifunctional vehicle antenna assembly of claim 1, wherein the primary MIMO antenna component or the secondary MIMO antenna component uses shape diversity or pattern diversity.

4. The multifunctional vehicle antenna assembly of claim 1, wherein the primary MIMO antenna component and the secondary MIMO antenna component further comprise a horizontally-polarized antenna and a vertically-polarized antenna.

5. The multifunctional vehicle antenna assembly of claim 1, wherein the primary MIMO antenna component both transmits and receives signals whereas the secondary MIMO antenna only receives signals.

6. The multifunctional vehicle antenna assembly of claim 1, further comprising a satellite radio antenna component located between the primary MIMO antenna component and the secondary MIMO antenna component.

7. The multifunctional vehicle antenna assembly of claim 6, further comprising a terrestrial radio antenna component.

8. The multifunctional vehicle antenna assembly of claim 1, wherein the secondary MIMO antenna component and the GNSS antenna component are communicatively linked to a single communication cable via a switch that enables data received via the secondary MIMO antenna component and the GNSS antenna component to be sent within a vehicle using the single communication cable.

9. The multifunctional vehicle antenna assembly of claim 1, further comprising an antenna enclosure within which the primary MIMO antenna component, the secondary MIMO antenna component, and the GNSS antenna component are fixed, wherein the antenna enclosure measures less than or equal to 180 millimeters (mm) in length, less than or equal to 80 mm in width, and less than or equal to 75 mm in height.

10. A multifunctional vehicle antenna assembly, comprising:
- a primary multiple input and multiple output (MIMO) antenna component having a plurality of antennas; and
- a secondary MIMO antenna component having a plurality of antennas, wherein the primary MIMO antenna component and the secondary MIMO antenna component are located less than or equal to 180 millimeters (mm) from each other;
- and wherein one of the MIMO antenna components comprises a horizontally-polarized antenna and the other of the MIMO antenna components comprises a vertically-polarized antenna.

11. The multifunctional vehicle antenna assembly of claim 10, wherein the primary MIMO antenna component or the secondary MIMO antenna component uses shape diversity or pattern diversity.

12. The multifunctional vehicle antenna assembly of claim 11, further comprising a satellite radio antenna component located between the primary MIMO antenna component and the secondary MIMO antenna component.

13. The multifunctional vehicle antenna assembly of claim 12, further comprising a terrestrial radio antenna component.

14. The multifunctional vehicle antenna assembly of claim 10, wherein the primary MIMO antenna component further comprises one or more vertically-polarized antennae and the secondary MIMO antenna component further comprises one or more horizontally-polarized antennae.

15. The multifunctional vehicle antenna assembly of claim 10, further comprising a global navigation satellite system (GNSS) antenna component, wherein the GNSS antenna component is located between the primary MIMO antenna component and the secondary MIMO antenna component.

16. The multifunctional vehicle antenna assembly of claim 15, wherein the secondary MIMO antenna component and the GNSS antenna component are communicatively linked to a single communication cable via a switch that enables data received via the secondary MIMO antenna component and the GNSS antenna component to be sent within a vehicle using the single communication cable.

17. The multifunctional vehicle antenna assembly of claim 15, further comprising an antenna enclosure within which the primary MIMO antenna component, the secondary MIMO antenna component, and the GNSS antenna component are fixed, wherein the antenna enclosure measures less than or equal to 180 millimeters (mm) in length, less than or equal to 80 mm in width, and less than or equal to 75 mm in height.

18. The multifunctional vehicle antenna assembly of claim 10, wherein the primary MIMO antenna component both transmits and receives signals whereas the secondary MIMO antenna only receives signals.

* * * * *